United States Patent
Dunn

(10) Patent No.: US 9,492,904 B1
(45) Date of Patent: Nov. 15, 2016

(54) PORTABLE MULTI-PURPOSE WORKSTATION CASE

(71) Applicant: James Bradley Dunn, Norcross, GA (US)

(72) Inventor: James Bradley Dunn, Norcross, GA (US)

(*) Notice: Subject to any disclaimer, the term of this patent is extended or adjusted under 35 U.S.C. 154(b) by 699 days.

(21) Appl. No.: 13/912,395

(22) Filed: Jun. 7, 2013

Related U.S. Application Data

(60) Provisional application No. 61/671,521, filed on Jul. 13, 2012.

(51) Int. Cl.
*A47B 85/00* (2006.01)
*B23Q 3/18* (2006.01)

(52) U.S. Cl.
CPC ..................... *B23Q 3/18* (2013.01)

(58) Field of Classification Search
CPC .............. A47B 17/03; A47B 17/033; A47B 17/04; A47B 17/02; A47B 21/04; A47B 23/002
USPC ........ 190/11, 1, 18 R, 900, 12 A; 312/223.3, 312/241, 244, 281, 902, 290; 108/14, 33, 108/143, 102, 43, 44; 206/320, 576, 571, 206/759, 762, 764, 305; 224/153
See application file for complete search history.

(56) References Cited

U.S. PATENT DOCUMENTS

| | | | | |
|---|---|---|---|---|
| 747,188 A | * | 12/1903 | Klee | A47B 23/042 24/DIG. 8 |
| 2,554,685 A | * | 5/1951 | St Denis | B60N 3/002 108/33 |
| D167,197 S | * | 7/1952 | Chappell | 312/290 |
| 2,609,072 A | * | 9/1952 | Levinson | A47B 3/10 108/33 |
| 3,263,779 A | * | 8/1966 | Bialer | A45C 13/02 190/110 |
| 4,564,091 A | * | 1/1986 | Coneglio | A45C 3/02 108/102 |
| 4,856,627 A | * | 8/1989 | Polatov | A45C 9/00 190/11 |
| 4,966,258 A | * | 10/1990 | Hawley | A45C 9/00 190/12 R |
| 5,400,903 A | * | 3/1995 | Cooley | A45C 13/02 190/29 |
| 6,068,355 A | * | 5/2000 | Thorp | A45C 9/00 108/177 |
| 6,454,064 B1 | * | 9/2002 | Cheng | A45C 9/00 190/11 |

(Continued)

*Primary Examiner* — Janet M Wilkens

(57) ABSTRACT

Described herein is a multipurpose workstation case for transporting, and utilizing a portable electronic device, such as a laptop computer, while maintaining optimized organization of documents. The multipurpose workstation case comprises a platform to receive and secure a portable electronic device. The case further comprises two work surface panels that can be drawn out and retracted through work surface panel slots, each located on a lateral side of the base. Each work surface panel comprises an upper and a lower wing panel, in which the upper wing panel flips up from a lower wing panel, subsequently allowing each to secure a document. In some implementations, the case can comprise one or more retractable drawers. The multipurpose workstation can accommodate multiple, distinct work areas for a user to organize documents while simultaneously using an electronic device.

18 Claims, 12 Drawing Sheets

(56) References Cited

U.S. PATENT DOCUMENTS

| | | | | |
|---|---|---|---|---|
| 6,460,746 | B1* | 10/2002 | Amram | A45F 3/047 |
| | | | | 224/579 |
| 6,571,922 | B1* | 6/2003 | Ruhmanseder | A45C 3/02 |
| | | | | 108/25 |
| 7,219,798 | B2* | 5/2007 | Chen | B65D 5/643 |
| | | | | 206/454 |
| 7,301,757 | B2* | 11/2007 | Lee | A45C 13/02 |
| | | | | 224/275 |
| 8,752,912 | B1* | 6/2014 | Johns | A47B 3/06 |
| | | | | 312/241 |
| 2003/0070948 | A1* | 4/2003 | Barber | A45C 5/00 |
| | | | | 206/320 |
| 2006/0237338 | A1* | 10/2006 | Nakamae | B65D 25/10 |
| | | | | 206/316.1 |
| 2010/0224532 | A1* | 9/2010 | Gonzalez | A47B 23/04 |
| | | | | 206/576 |

* cited by examiner

PORTABLE MULTI-PURPOSE WORKSTATION CASE

CROSS REFERENCE TO RELATED APPLICATION

This application is a non-provisional application claiming the benefit of U.S. Provisional Application Ser. No. 61/671,521, entitled "Gizmo Widget," which was filed on Jul. 13, 2012, and is incorporated herein by reference in its entirety.

TECHNICAL FIELD

This disclosure relates generally to the field of accessories for portable electronic devices and methods for using the same. In particular, this disclosure relates to an encasement for portable electronic devices that promotes optimized placement of workstation documents.

BACKGROUND

Individuals working with portable electronic devices, such as a laptop/notebook computer, typically use the electronic devices in places other than a typical school or office space (e.g., hotels/motels, airports, public transportation, etc.). Organizing paperwork and/or study materials while working in conjunction with a laptop computer (or other electronic device) is paramount to creating an efficient, clean, convenient and clutter-free workspace. Organizing paperwork while using an electronic device is generally accomplished through the use of paperclips, clipboards, folders, briefcases, and the like. Resorting to the previously mentioned means of organization can cause physical separation of the paperwork or materials from the electronic device and can potentially lead to the inconvenience of spending time searching for and retrieving the separated paperwork or materials. Some accessories have attempted to solve these problems. However, the existing accessories either do not entirely resolve these problems, or present their own shortcomings.

U.S. Pat. No. 5,217,119 (Hollingsworth), hereinafter referred to as Hollingsworth, discloses a carrying case for a laptop computer having storage compartments. Although the case described in Hollingsworth provides a means for organizing paperwork via storage compartments, it does not solve the problem of a user being able to secure documents while simultaneously using a laptop computer.

U.S. Pat. No. 6,234,085 B1 (Ramundo), hereinafter referred to as Ramundo, discloses a portable laptop computer tray. Although the expandable panel is capable of accommodating a small laptop computer and associated accessories such as files, folders, papers and the like, the Ramundo invention does not provide for a way to stabilize and secure corresponding paperwork.

U.S. Pat. No. 7,281,877 B1 (Lederer et. al), hereinafter referred to as Lederer, discloses a panel for securing small electronic devices. However, the panel described by Lederer does not accommodate larger electronic devices, such as a laptop computer, and does not provide a user with an efficient means for storing and utilizing documents and other paperwork.

U.S. Pat. No. 7,628,271 B1, hereinafter referred to as Marton, discloses a carrying case for laptop computers. The invention describes a vertical panel for attaching paperwork to. However, the invention described by Marton does not allow a user to efficiently annotate paperwork attached to the vertical panel.

U.S. Pat. No. 6,851,656 B2, hereinafter referred to as Bauman, discloses a removable paper support device holding paperwork above the screen of a laptop computer. However, the Bauman invention fails to provide a user with a horizontal writing surface or a means for securing a document to the horizontal writing surface.

An individual using a laptop computer workstation, hereinafter referred to as a user, often works in a variety of environments including, but not limited to, a business office, airport terminal, hotel lobby, coffee shop, restaurant, adult beverage establishment, etc. A user can be required to operate in confined or tight spaces, thereby creating a need to retain an uncluttered, clean, efficient and self-contained area in order to optimize workflow output. Under a myriad of work situations where additional paperwork, in combination with a laptop computer or the like, is required to compliment and complete a project, it is desirable to optimally position and properly support the laptop and the paperwork for ease of access and direct editing. Prior attempts to solve this issue have failed to provide a means for convenient and easy editing of documents or paperwork that can be secured in a convenient position relative to a laptop computer or similar device. Therefore, there remains a need, not only for optimized positioning of paperwork for purposes of reading and editing in conjunction with using a laptop computer, but also for a device that allows a user to utilize multiple and distinct documents, thus allowing a user to easily access and edit paperwork and greatly minimize disruption of productivity.

BRIEF DESCRIPTION OF THE DRAWINGS

Like reference numbers and designations in the various drawings indicate like elements.

DETAILED DESCRIPTION

Figure 1:
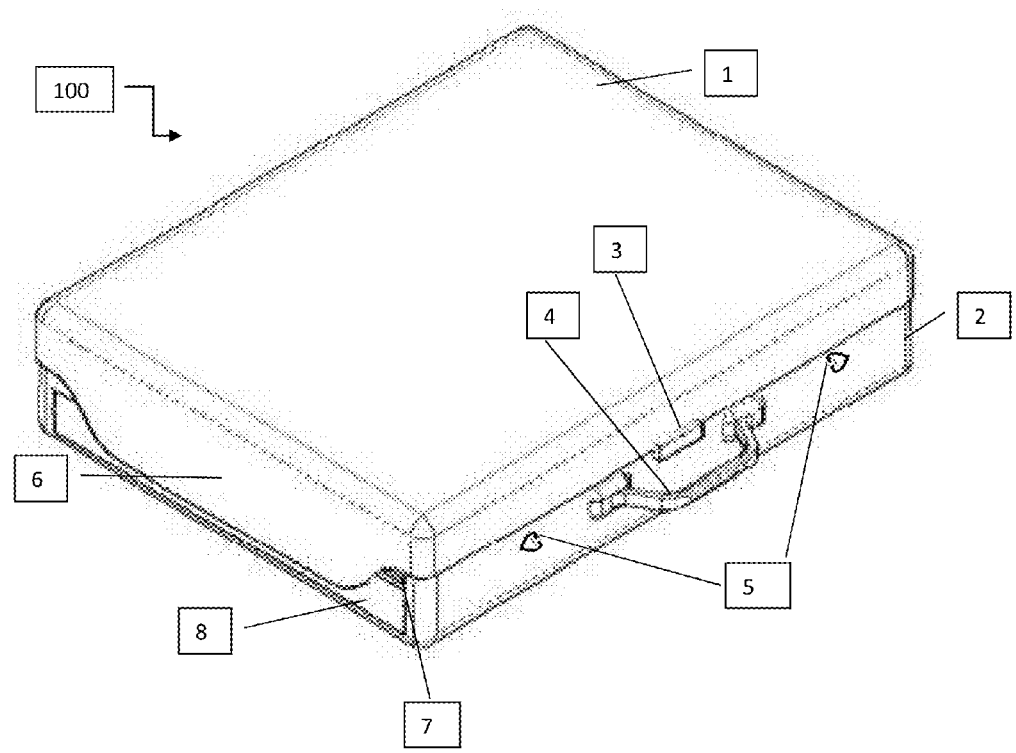
FIG. 1 illustrates a portable multipurpose workstation case in a resting or closed position.

In some implementations of this disclosure, a carrying case can comprise a platform operable to secure an electronic device for transporting or for operational purposes and self-containing retractable work panels which can be operable to receive, secure, and position documents while a user operates the electronic device. It is an object of the carrying case to eliminate the need to use multiple devices to receive, secure, and position documents while operating an electronic device. The present invention can allow a user to extend one or more work surface panels from the carrying case, and flip up one or more paper grip panels into an upright position, thus creating two or more distinct work areas for document analysis (e.g., the upper paper grip panel can be used primarily for document reading and analysis, and the lower wing panel can be used primarily for document reading, analysis, and editing). A user can then manually place one or more documents within a provided gripper area to secure the one or more documents to the paper grip panel.

It is another object of the present invention to accommodate both right-handed and left-handed users by providing retractable and flip-up paper grip panels on either or both the right side and left side of the carrying case.

It is yet another object of the present invention to offer a user at least four areas with which to secure documents by providing the user with the ability to simultaneously use two or more flip-up paper grip panels. Having at least four areas with which to secure documents can provide a user with efficient and convenient access to multiple distinct documents while using an electronic device.

Still other objects of the present invention will become readily apparent to those skilled in the art from the following description, wherein there is shown and described the embodiments of the invention by illustrating the best modes suited to carry out the invention. As will be realized from the following description, the present invention is capable of various other embodiments and its several details are capable of modifications in various aspects without departing from the scope of the invention. Accordingly, the drawing and descriptions will be regarded as illustrative in nature and not as restrictive.

Referring now to the drawings, the following detailed description provides principles and concepts to enable a person skilled in the art to make and use a new portable workstation for mobile electronic devices, herein referred to as the portable multipurpose workstation case 100. The figures and various drawings, which are not necessarily drawn to scale, are not intended to limit the scope of the present invention. The scope of the present invention includes not only that which is described in this disclosure, but also that which is known in the prior art and alternative embodiments of the present invention which may be contemplated by those skilled in the relevant art and which are taught by this disclosure.

The frame-work of the portable multipurpose workstation case 100 can comprise any suitable material having various strengths and durability (e.g., plastics, metals, synthetics, alloys, etc.). In some implementations, the frame-work can comprise heavy-duty plastics or lightweight alloys such as aluminum. In various implementations, the outer surface of the portable multipurpose workstation case 100 can comprise any material that is sufficient to meet structural, protective, manufacturing or aesthetic needs (e.g., plastics, synthetics, metals, hard foam, animal hides, etc).

The claimed subject matter is now described with reference to the various figures briefly described above. Throughout the following detailed description, for purposes of explanation, numerous specific details are set forth in order to provide a thorough understanding of the claimed subject matter. It may be evident, however, that the claimed subject matter may be practiced with or without any combination of these specific details, without departing from the spirit and scope of this invention and the claims.

FIG. 1 illustrates the portable multipurpose workstation case 100 in a resting or closed position comprising a lid 1 intermittently attached to a body 2 by way of a latch 3. In various implementations, the latch 3 can be located on the top panel of the lid 1 and can be attached to a clasp that can be positioned on the body 2. A handle 4 can be positioned on the front panel of the body 2, thus enabling a user to grasp the handle 4 and transport the portable multipurpose workstation case 100. In some implementations, the latch 3 and the handle 4 can be centered along the length of the front plane of the body 2. In addition, as an alternative means for transporting the portable multipurpose workstation case 100, two strap rings 5 can be positioned on the front plane of the body 2 and can accommodate a strap having clasps on each end of the strap.

The lid 1 can also comprise one or more sloped sheaths 6. In various implementations, the one or more sloped sheaths 6 can be widened or tapered portions of the left and/or right lateral panels of the lid 1. When the portable multipurpose workstation case 100 is in a resting or closed position, each sloped sheath 6 can partially or entirely cover a work surface unit slot 7 and a drawer opening 8.

Figure 2:
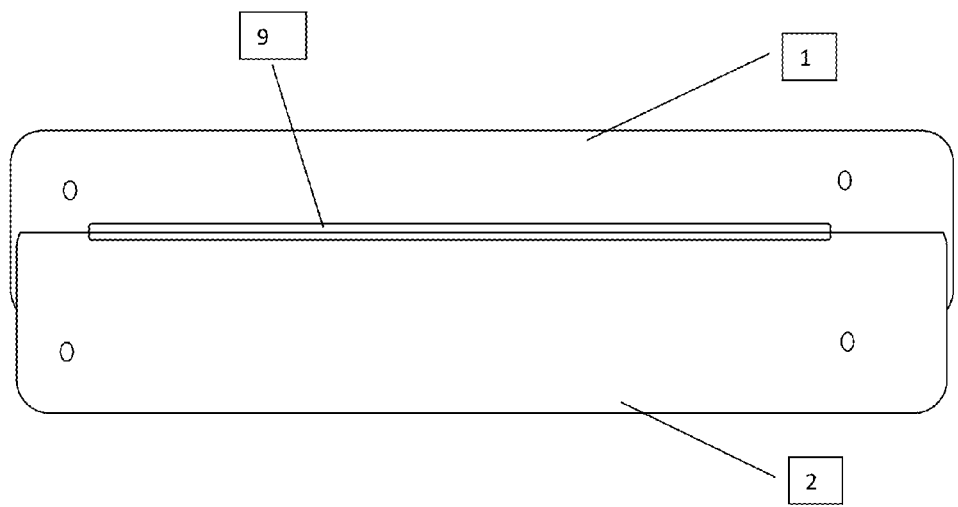
FIG. 2 illustrates a bottom view of a portable multipurpose workstation case in a resting or closed position.

FIG. 2 illustrates a bottom view of the portable multipurpose workstation case 100, in its resting position, wherein the back planes of the lid 1 and the body 2 are connected by way of a case hinge 9. The case hinge 9 can allow a user to pivot the lid 1 away from the body 2 (to an open position). In some implementations, the case hinge 9 can comprise a hinge of various types (e.g., torque hinge, positional hinge, etc.). In some implementations, the latch 3 can be operable to preclude the lid 1 from inadvertently pivoting away from the body 2.

Figure 3:
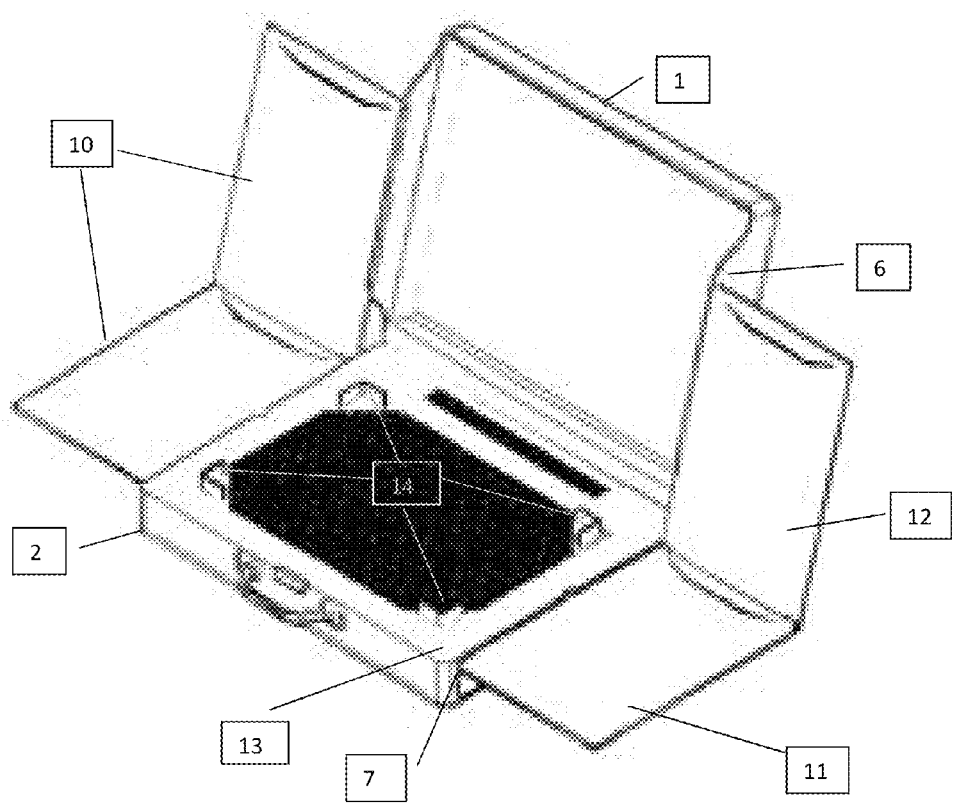
FIG. 3 is a perspective view of a portable multi-workstation case with the lid open and work surfaces extended.

FIG. 3 illustrates a perspective view of a portable multipurpose workstation case 100 with the lid 1 shown in an opened position. When the portable multipurpose workstation case 100 is in a resting or closed position, each sloped sheath 6 can partially or entirely cover a work surface unit slot 7, through which a set of work surface units 10 may be pulled out from the interior of the case for utilization. Each of the work surface unit slots 7 can be so dimensioned as to allow each work surface unit 10 to be drawn in and out of the body 2 through the work surface unit slot 7. When the lid 1 is in a closed position, each of the sloped sheaths 6, can be operable to preclude each of the work surface units 10 from inadvertently sliding out of the body 2, through the work surface unit slot 7. When the lid 1 is placed in an opened position, the sloped sheaths 6 can fully expose each of the work surface unit slots 7, thereby allowing a user to start the process of drawing out the work surface units 10. In some implementations, each of the work surface units 10 can comprise a lower work surface panel 11 and an upper flip panel 12.

In various implementations, the upper-horizontal plane of the body 2 can comprise a means for securing an electronic device. For example, the upper horizontal plane of the body 2 can comprise an electronic device platform 13 and a set of four or more mounting brackets 14. An electronic device can be placed onto the electronic device platform 13 and secured by the mounting brackets 14.

Figure 4:
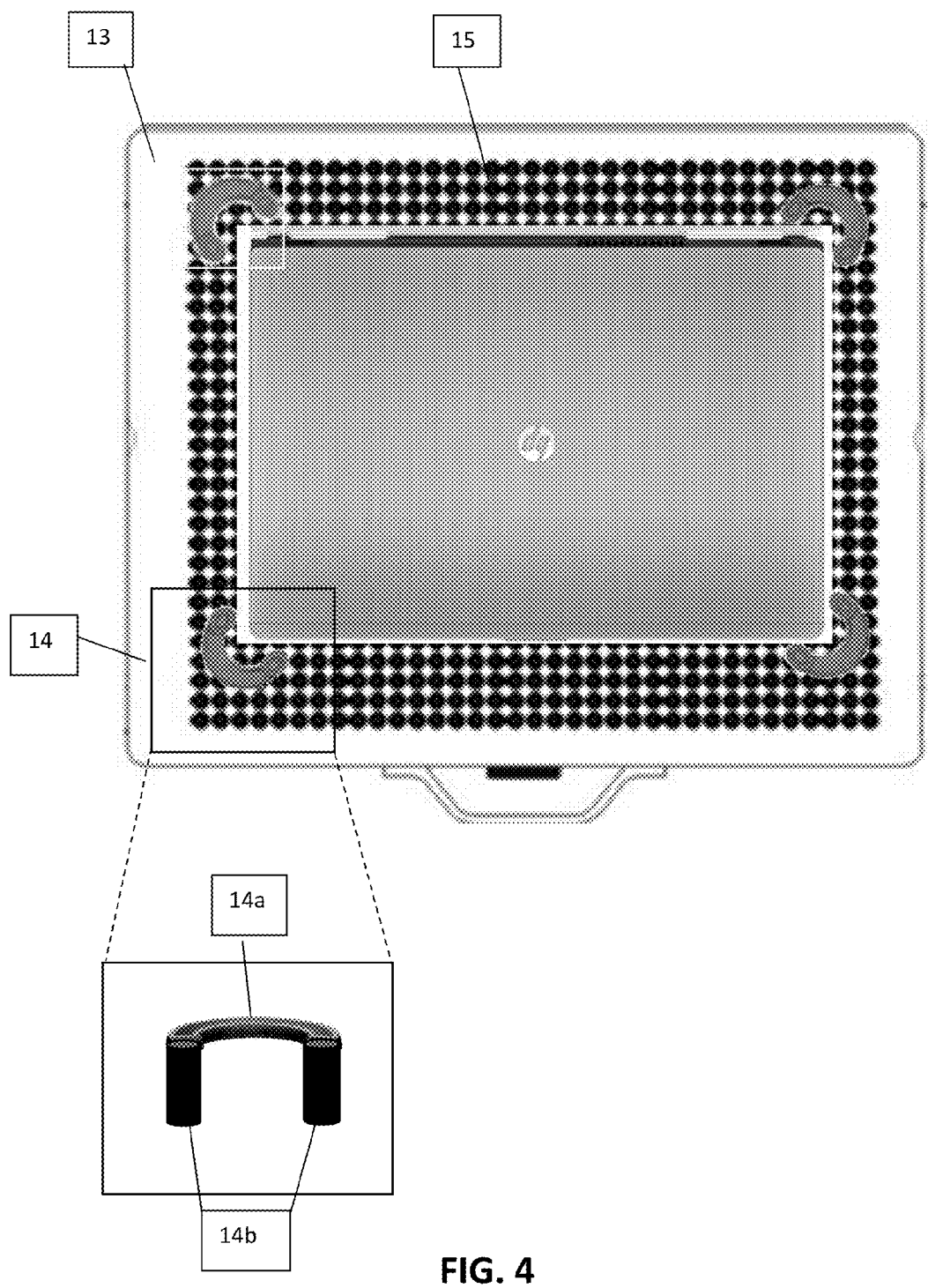
FIG. 4 is an exploded view of a portable multi-workstation case showing a support platform and brackets that are operable to secure an electronic device to the support platform.

FIG. 4 illustrates an exploded view of an isolated electronic device platform 13 and a set of four mounting brackets 14. In some implementations, the electronic device platform 13 can comprise an array of platform perforations 15 to aid in the ventilation and heat dissipation of an electronic device. In some implementations, the one or more mounting brackets 14 can comprise one or more perpendicular bracket arms 14a and one or more bracket pegs 14b. In various implementations, the platform perforations 15 can be further utilized to receive the one or more mounting brackets 14 via the bracket pegs 14b. For example, the platform perforations 15 can be so dimensioned as to allow one or more bracket pegs 14b to be snuggly placed into one or more of the perforations. In some implementations, the platform perforations 15 can be made in a pattern of symmetrical rows and columns, thereby providing a user with the flexibility to adjust the placement position of the one or more mounting brackets 14 so as to best secure electronic devices of varying sizes onto the electronic device platform 13.

Figure 5:
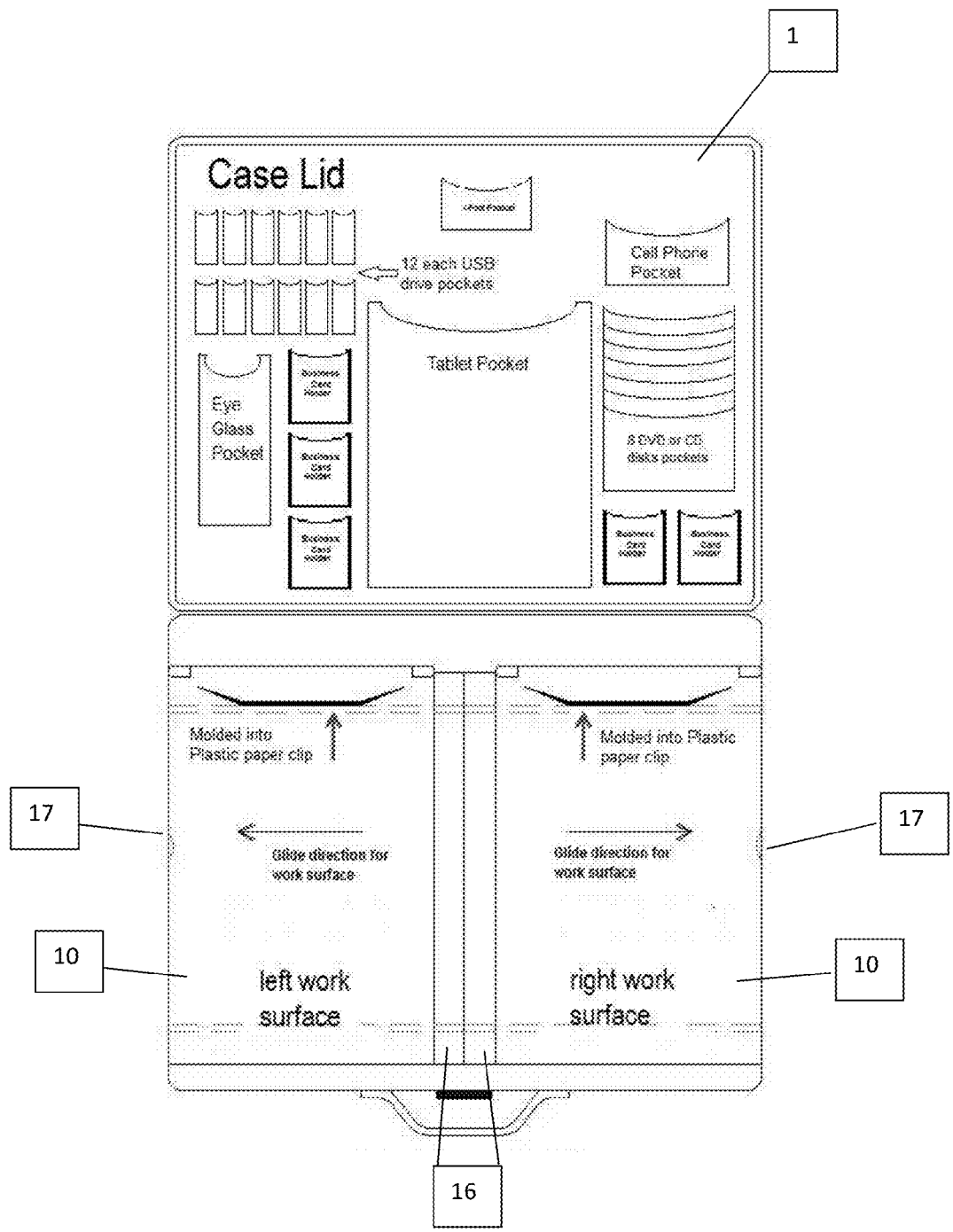
FIG. 5 illustrates a plan view showing a portable multipurpose workstation case with the electronic device platform and mounting brackets removed and with the lid in an opened position so as to directly view the relative positions of folded and fully retracted work surface units within the portable multipurpose workstation case.

FIG. 5 illustrates a plan view showing the portable multipurpose workstation case 100 with the electronic device platform 13 and a set of mounting brackets 14 removed and with the lid 1 in an opened position so as to directly view the relative positions of folded and fully retracted work surface units 10 within the portable multipurpose workstation case 100. The proximal edges of each of the folded and retracted work surface units 10 can lie flush with the outer edge of their respective work surface unit slot 7. The distal edges of each of the folded and retracted work surface units 10 can lie flush with a center piece (not shown in FIG. 5). Therefore, the combined widths of the work surface units 10 in their retracted and folded position can be equivalent or nearly equivalent to the width of the portable work station case 100.

In some implementations, the width of the top and bottom edges of the upper flip panel 12 can be narrower than the width of the top and bottom edges of the lower work surface panel 11, thereby creating a lower work surface panel extension region 16. The width of the lower work surface panel extension region 16 can be equivalent to the difference between the width of the upper flip panel 12 and the width of the lower work surface panel 11. In some implementations, a lower work surface panel extension region 16 can be located on the distal edge of each of the lower work surface panels 11 and the length of the lower work surface panel extension region 16 can be equivalent to the length of a lower work surface panel 11. The lower work surface panel extension region 16 can provide a hinge to support a work surface unit 10 when the work surface unit 10 is extended. In various implementations, the width of a lower work surface panel extension region 16 can be so dimensioned as to allow a work surface unit 10 to support a downward force that is placed on the lower work surface panel 11 and created during use of the panel (e.g., pressing down on the lower work surface panel 11 when writing on a document and other foreseeable uses). The lower work surface panel extension region 16 can further allow each work surface unit 10 to be extended through its respective work surface unit slot 7 without becoming disconnected from the body 2 (e.g., an edge, protrusion, tapered section, or other means can be located on the lower work surface panel extension region 16 to prevent a disconnect between a work surface unit 10 and the body 2).

In some implementations, a lower work surface panel grip 17 can be centrally located with respect to the proximal edge of a lower work surface panel 11. In some implementations, a lower work surface panel grip 17 can comprise any means for allowing a user to grasp an edge of a lower work surface panel 11 (e.g., a knob, an indentation, etc.). In some implementations, the interior of the lid 1 can comprise one or more means for holding various items (e.g., pouches or pockets for holding pens, pencils, glasses, mobile devices, USB drives, DVDs, business cards, etc.).

Figure 6:
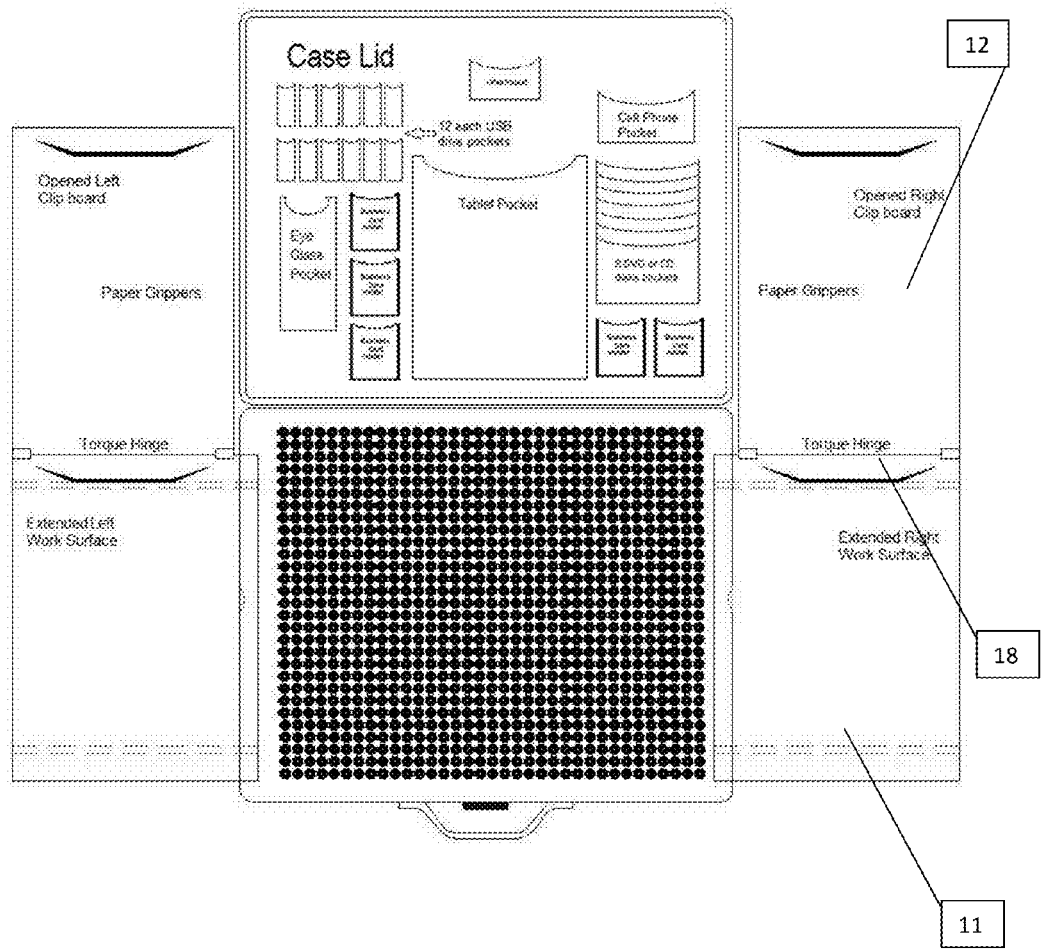
FIG. 6 is a plan view of a portable multipurpose workstation case with the lid open, the work surface units fully extended, and the upper flip panels open relative to the lower work surface panels.

FIG. 6 is a plan view of the portable multipurpose workstation case 100 with the lid 1 open, the work surface units 10 fully extended, and the upper flip panel 12 open relative to the lower work surface panel 11. In some implementations, each work surface unit 10 can comprise a lower work surface panel 11 and an upper flip panel 12. In various implementations, a work surface unit hinge 18 can connect the top edge of the lower work surface panel 11 to the bottom edge of the upper flip panel 12. In some implementations, a work surface unit hinge 18 can comprise a torque hinge, positional hinge, or any other means for pivoting the upper flip panel 12 away from the lower work surface panel 11. The work surface unit hinge 18 can allow a user to adjust and optimize the angle of the upper flip panel 12 with respect to the lower work surface panel 11 once the work surface unit 10 has been fully drawn out of the work surface unit slot 7. For example, the work surface unit hinge 18 can comprise a stopping mechanism to position the upper flip panel 12 at an optimal angle relative to the lower work surface panel 11.

Figure 7:
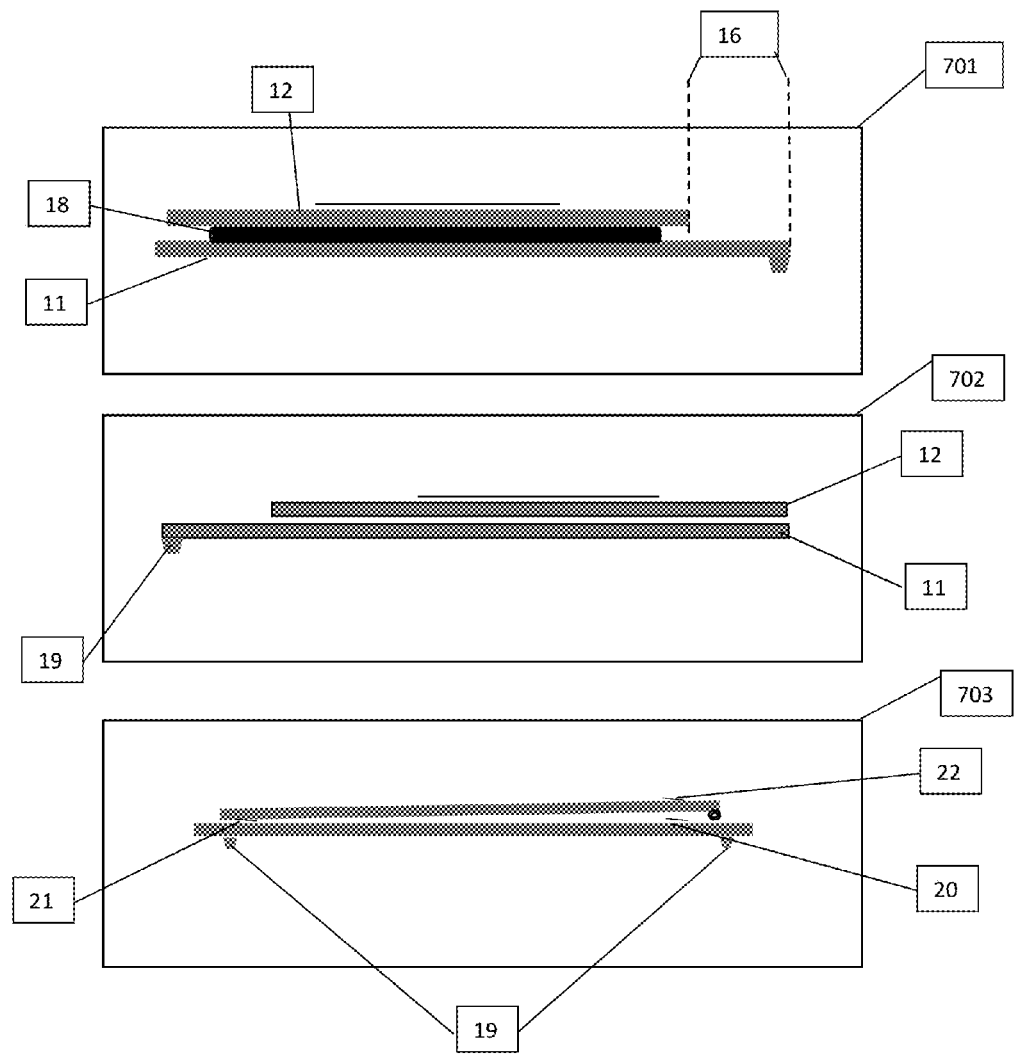
FIG. 7 is a cross-sectional top view, bottom view, and side view of an isolated work surface that is folded to a closed position.

FIG. 7 illustrates three cross-sectional views of an isolated and folded work surface unit 10: the first view 701 is a top view of a folded work surface unit 10; the second view 702 is a bottom view of a folded work surface unit 10; and the third view 703 is a side view of the proximal edge of a folded work surface unit 10. The top view 701 shows that the upper flip panel 12 and the lower work surface panel 11 are connected via the work surface unit hinge 18 located along the top edge of the work surface unit 10. In some implementations, a single or multiple stoppers 19 can be affixed to the underneath side of the lower work surface extension region 16 so as to preclude the work surface unit 10 from fully separating or detaching away from the portable multipurpose workstation case 100. In some implementations, the stoppers 19 can comprise any means for precluding a work surface unit 10 from sliding all the way out of the portable multipurpose workstation case 100 (e.g., an edge, protrusion, tapered section, etc.). There are several ways in which one who is skilled in the art can affix the stopper(s) 19 to the underneath surface of the lower work surface extension region 16. A preferred method to affix the stopper(s) 19 is by directly molding them onto the lower work surface panel 11 as the lower work surface panel 11 is molded.

The cross-sectional view 702 of the bottom edge of the folded work surface unit 10 shows that the stopper(s) 19 can be located along the distal end of the lower work surface panel 11, and more specifically within the underneath side of the lower work surface extension region 16. In some implementations, the stopper(s) 19 can run the entire length of the distal edge of a lower work surface panel 11.

The side view 703 shows the top edge of the folded work surface unit 10, including the relative positions of the lower work surface panel 11, the lower work surface extension region 16, and the upper flip panel 12. In the side view 703, the stopper(s) 19 are located on the underneath surface of the lower work surface extension region 16. In some implementations, each of the lower work surface panels 11 and upper flip panels 12 can comprise one or more means for attaching or securing a document to the panel. For example, an attached lower document holder 20 and/or an attached upper document holder 21 can be located on the upper-end (when the work surface unit 10 is unfolded) of each of the lower work surface panels 11 and/or upper flip panels 12, respectively. In some implementations, a rear-upper document holder 22 can be located on the hinge-end of the back of the upper flip panel 12. For example, the rear-upper document holder 22 can be so positioned as to secure a document when a work surface unit 10 is extracted and in a closed position.

Figure 8:
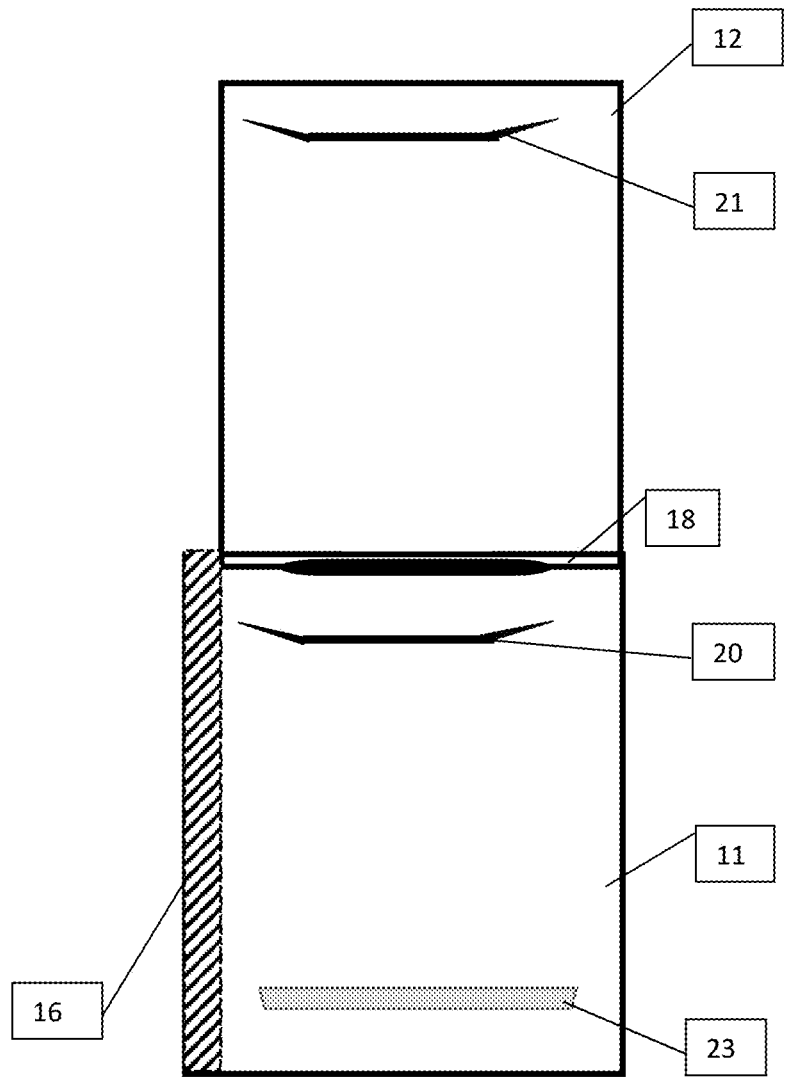
FIG. 8 is a plan view of an isolated work surface that is unfolded into an open position.

FIG. 8 is a plan view of an isolated unfolded right work surface unit 10 showing the lower work surface panel 11 with its lower work surface extension region 16 and the upper flip panel 12. In some implementations, the document holders 20, 21, and 22 can comprise any means for securing one or more documents (e.g., flexible indentation, plastic, metallic, wire, or spring clasp, etc.). The document holders 20, 21, and 22 can be attached to the lower work surface panels 11 and/or the upper flip panels 12 via rivets, screws, or the like. The work surface unit hinge 18 is shown to interconnect the lower work surface panel 11 to the upper flip panel 12. In some implementations, a document holder indentation 23 can be located on each of the lower work surface panels 11. For example, the document holder indentation 23 can be so positioned and dimensioned as to allow the upper document holder 21 to fit into the document holder indentation 23 when the work surface unit 10 is in the closed position.

Figure 9:
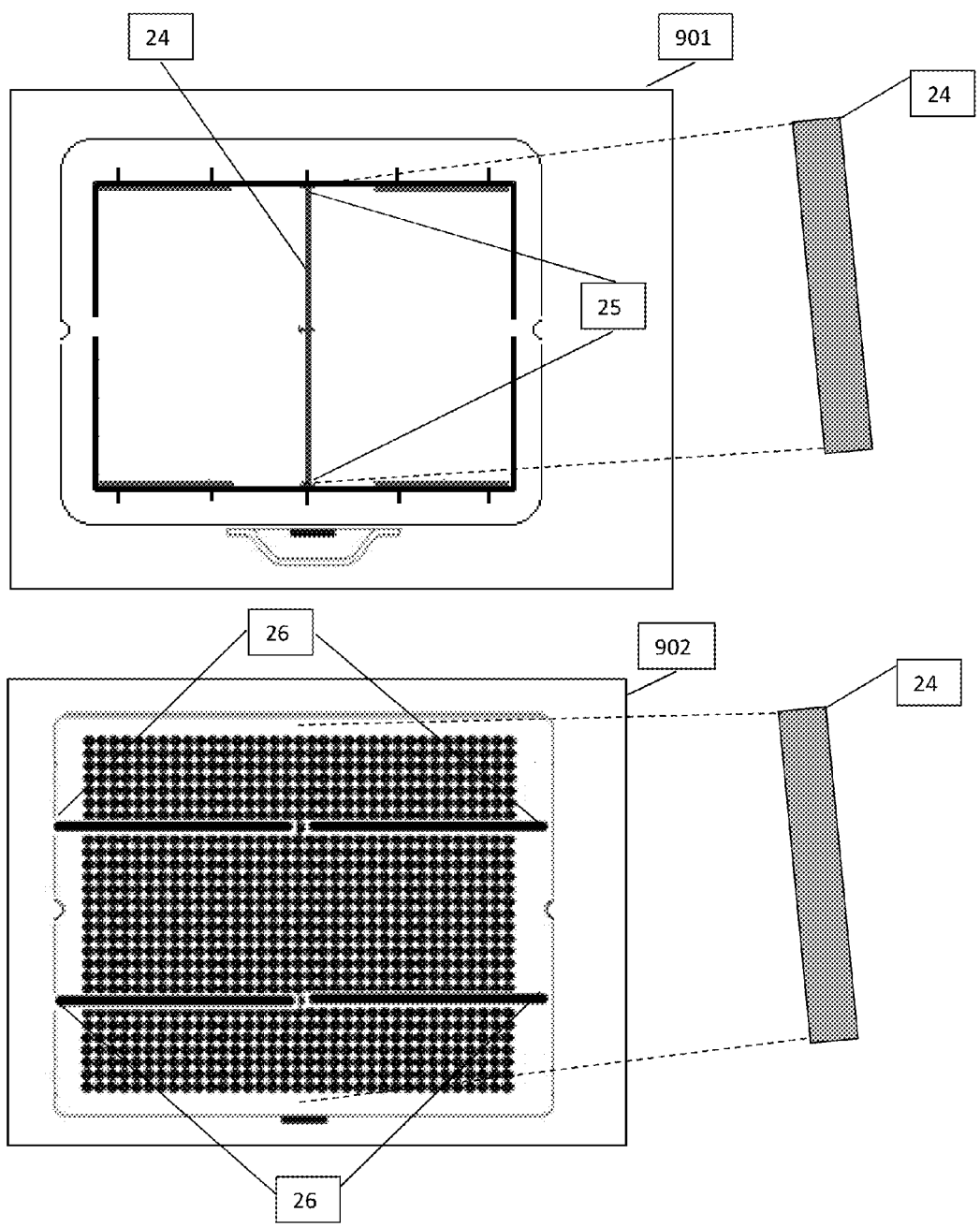
FIG. 9 is an exploded view of a portable multipurpose workstation case showing internal framework underlying an electronic device platform, and a bottom view of the electronic device platform.

FIG. 9 is an exploded view of the body 2 of the portable multipurpose workstation case 100 showing a top view 901 of the body 2 where the electronic device platform 13 has been removed, and a bottom view 902 of the electronic device platform 13. A platform support 24 can be centrally positioned with respect to the length of the front and back planes of the body 2. In some implementations, the platform support 24 can be held in a secure position by one or more platform support notches 25 into which the platform support 24 can slide. In various implementations, one or more pins or pegs can be molded onto the bottom of the platform support 24, and the pins or pegs can fit into slots located on the inside surface of the body 2. In some implementations, the platform support 24 can be securely attached to the inside surface of the body 2 via a glue, epoxy, or any other means of attachment. The platform support 24 can be operable to support not only the weight of the electronic device platform 13, but also the weight of the electronic device resting on top of the electronic device platform 13. The platform support 24 can comprise any material that is sufficient to support the weight of the electronic device platform 13 and the weight of an electronic device.

In some implementations, one or more support ribs 26 can be located underneath the electronic device platform 13 and can run perpendicular to the platform support 24 from the platform support 24 to the lateral plane of the body 2. As an example, the one or more support ribs 26 can be molded onto the bottom plane of the electronic device platform 13.

Figure 10:
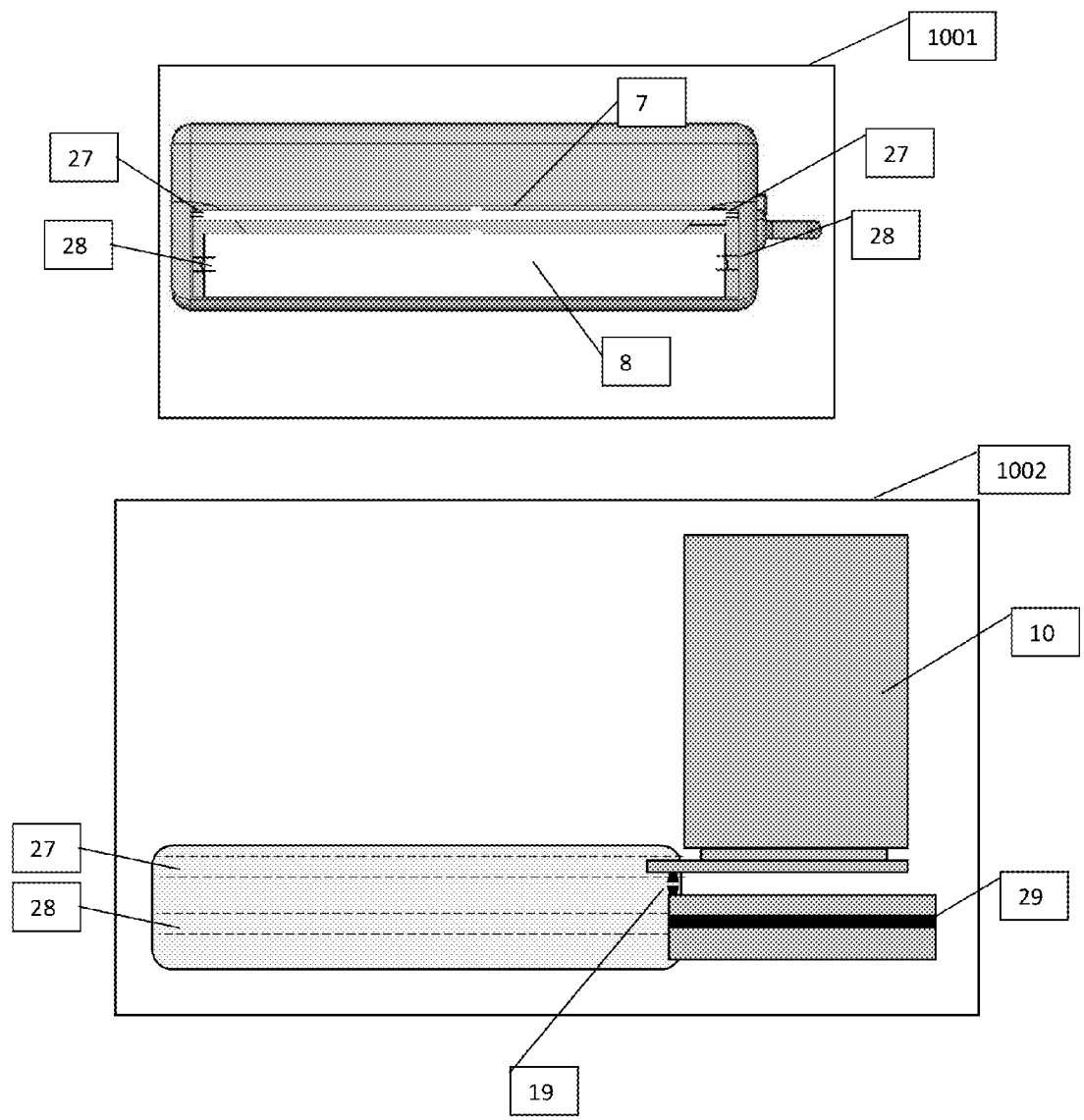
FIG. 10 is a cross-sectional side view of a portable multipurpose workstation case showing a work surface unit slot and a drawer opening, and a cross-sectional front view of the portable multipurpose workstation case showing the paths of work surface unit and drawer glide tracks.

FIG. 10 shows a cross-sectional view 1001 of the side of the body 2 of the portable multipurpose workstation case 100 and a cross-sectional front view 1002 of the portable multipurpose workstation case 100. The cross-sectional view 1001 shows a work surface unit slot 7 and a drawer opening 8. In some implementations, a pair of parallel work surface unit tracks 27 can be positioned on the inner surfaces of the front and back planes of the body 2. For example, each work surface unit track 27 can comprise an upper track and a lower track, wherein the distance between the lower track and the upper track can be sufficient to accommodate the total thickness of a work surface unit 10 or, in the alternative, the thickness of a flange (e.g., a thin extension running along the front and back planes of each lower work surface panel 11) molded on the work surface unit 10. In some implementations, the electronic device platform 13 can fit into the body 2 and can rest on and be securely attached to the upper track of each work surface unit track 27 as well as the top surface of the platform support 24. In various implementations, each of the work surface unit tracks 27 can run the width of the portable multipurpose workstation case 100.

In some implementations, a pair of parallel drawer tracks 28 can be positioned on the inner surfaces of the front and back planes of the body 2 and below the pair of work surface unit tracks 27. For example, each drawer track 28 can comprise an upper track and a lower track, wherein the distance between the lower track and the upper track can be sufficient to accommodate the total thickness of a drawer 29 or, in the alternative, the thickness of a flange (e.g., a thin extension running along the front and back planes of each drawer 29) molded onto the drawer 29. In various implementations, each of the drawer tracks 28 can run the width of the portable multipurpose workstation case 100.

The cross-sectional view 1002 shows the path of the pair of work surface unit tracks 27 and the pair of drawer tracks 28 running across and parallel to the front plane of the body 2 and are positioned on the inner surfaces of both the front and back planes of the body 2. Again, the tracks can be so dimensioned as to allow a work surface unit 10 or a drawer 29 to be drawn out of and retract into the body 2. In some implementations, one or more drawers 29 can be drawn out of and retracted into the body 2. For example, a left-drawer and a right-drawer can be so dimensioned as to retract into the body 2 with the outer planes of both drawers 29 being flush with the lateral planes of the body 2 when fully retracted.

In various implementations, a drawer 29 can fit into a drawer track 28, thereby allowing the drawer 29 to retract into and extend out of the body 2. For example, a pair of parallel drawer tracks 28 can be positioned on the interior surface of the front and back planes of the body 2. In some implementations, the pair of parallel drawer tracks 28 can be positioned below the pair of work surface unit tracks 27. In some implementations, one or more drawer tracks 28 can be molded onto the inner-surface of the front and back panels of the body. A drawer 29 can slide into and out of the body 2 of the portable multipurpose workstation case 100 by way of the drawer tracks 28. In some implementations, one or more flanges molded onto a drawer 29 can provide a means for attaching the drawer 29 to the one or more drawer tracks 28.

In various implementations, each drawer 29 can comprise a means for precluding the drawer 29 from detaching from its respective drawer track 28. For example, one or more stoppers 19 can be attached to or molded on the top and/or bottom planes of each drawer 29.

Figure 11:
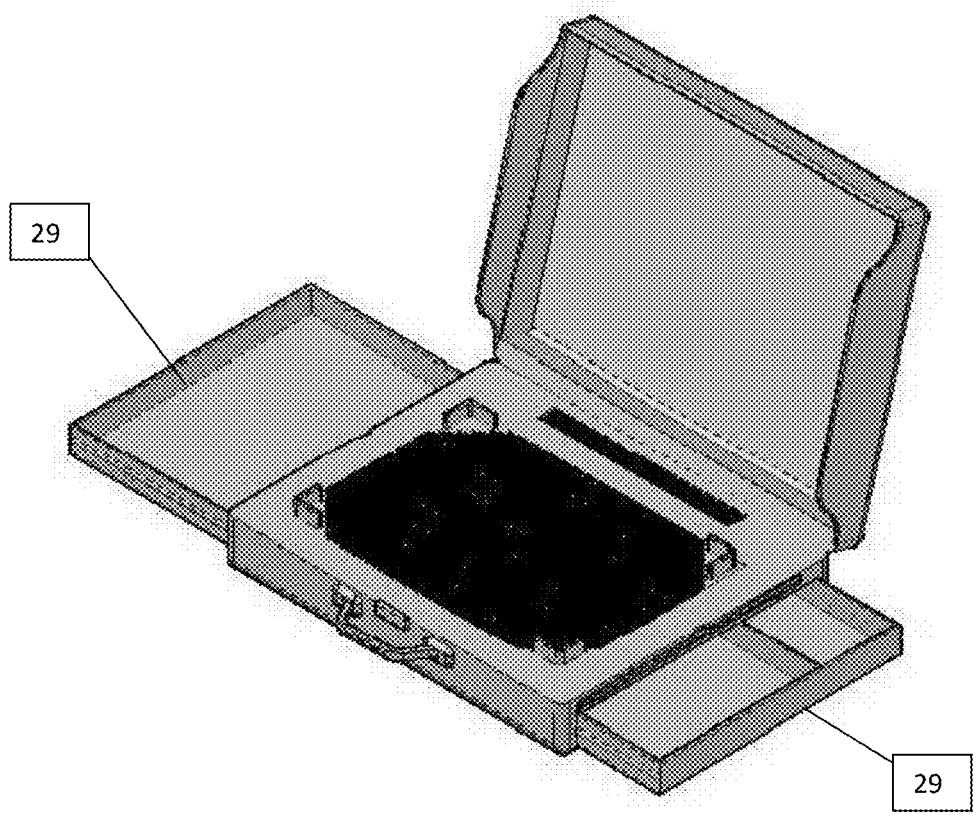
FIG. 11 is a perspective view of a portable multipurpose workstation case with the lid open, the work surface units retracted, and the drawers extended.

FIG. 11 is a perspective view of a portable multipurpose workstation case 100 with the lid 1 open, the work surface units 10 retracted, and the drawers 29 extended. In some implementations a drawer 29 can comprise one or more compartments. For example, one or more spacers or walls can be molded into a drawer 29 in order to create multiple compartments.

Figure 12:
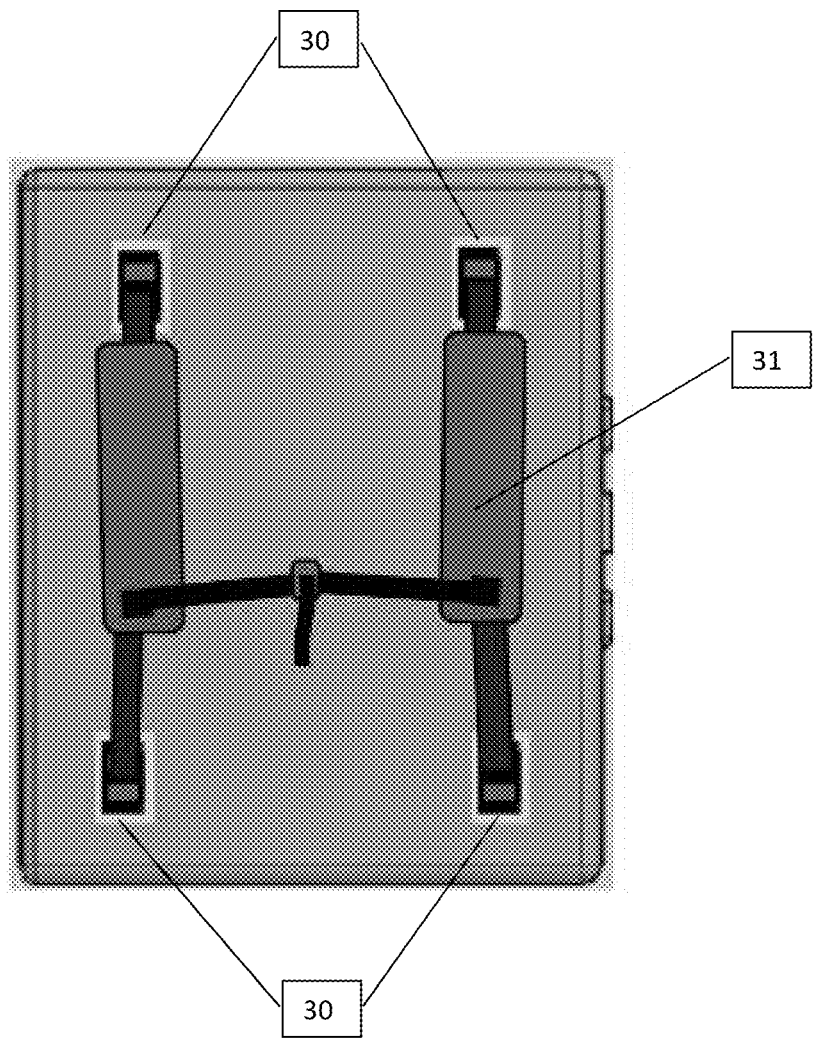
FIG. 12 is a back view of a portable multipurpose workstation case showing backpack strap rings and a backpack strap system.

FIG. 12 is a back view of a portable multipurpose workstation case 100 showing backpack strap rings 30 and a backpack strap system 31. In some implementations, backpack strap rings 30 can be molded onto the bottom plane of the body 2. It should be understood that there are various other means for attaching a backpack strap system 31 to the multipurpose workstation case 100 to provide a user with the ability to transport the case as a backpack.

In some implementations, the back surface of the body 2 can comprise a textured outer surface (e.g., etched, roughed, etc.) to help reduce slippage of the portable multipurpose workstation case 100 from the surface onto which it is placed (e.g., a user's lap, desk, podium, platform, etc.). The area of texturing can encompass the entire bottom surface of the body 2 or only a portion of the surface of the body 2.

It is, of course, not possible to describe every conceivable combination of components or methodologies for purposes of describing the claimed subject matter, but one of ordinary skill in the art can recognize that further combinations and permutations of such matter are possible. Accordingly, the claimed subject matter is intended to embrace all such alterations, modifications and variations that fall within the spirit and scope of the appended claims.

What is claimed is:

1. A portable multipurpose workstation case comprising:
   a lid comprising a top plane perpendicular to two lateral planes, a front plane, and a back plane;
   a body comprising a front plane, a back plane, and a top plane that is parallel to a bottom plane, wherein the top plane and the bottom plane are perpendicular to and attached to two lateral planes;
   means for interconnecting the back plane of the body to the back plane of the lid and for enabling the front plane of the lid to pivot away from the front plane of the body; and
   one or more work surfaces that are operable to lie inside the body and parallel to the bottom plane of the body, the one or more work surfaces being further operable to be drawn through the lateral planes of the body to a position outside of the body; and
   wherein the lid further comprises one or more sloped sheaths located on each of the lateral planes of the lid, wherein the one or more sloped sheaths are so dimensioned as to prevent the one or more work surfaces from being drawn through the lateral planes of the body when the lid is in a closed position.

2. The portable multipurpose workstation case of claim 1, wherein the top plane of the body comprises a platform having multiple perforations and one or more mounting brackets.

3. The portable multipurpose workstation case of claim 2, wherein the one or more mounting brackets comprise one or more arms and pegs.

4. The portable multipurpose workstation case of claim 1, wherein the inner surfaces of the front and back planes of the body comprise one or more work surface tracks.

5. The portable multipurpose workstation case of claim 4, wherein each of the one or more work surfaces comprises one or more flanges so dimensioned as to slide into the one or more work surface tracks.

6. The portable multipurpose workstation case of claim 1, wherein each lateral plane of the body comprises a slot running parallel to the lateral and bottom planes of the body, wherein the slot is so dimensioned as to allow one of the one or more work surfaces to be drawn through the slot.

7. The multipurpose workstation case of claim 1, wherein each of the one or more work surfaces comprises a lower work surface panel and an upper flip panel.

8. The multipurpose workstation case of claim 7, wherein a work surface unit hinge connects the lower work surface panel to the upper flip panel.

9. The multipurpose workstation case of claim 7, wherein the lower work surface panel and the upper flip panel each comprise one or more means for securing one or more documents to the lower work surface or the upper flip panel.

10. The multipurpose workstation case of claim 9, wherein the lower work surface panel comprises an indentation in which to overlay the means for securing one or more documents to the upper flip panel so as to enable the upper flip panel to fold flat against the lower work surface panel.

11. The multipurpose workstation case of claim 1, wherein the one or more work surfaces further comprise one or means for precluding the one or more work surfaces from detaching from the body.

12. The multipurpose workstation case of claim 11, wherein the means for precluding the one or more work surfaces from detaching from the body comprises one or more stoppers located on each of the one or more work surfaces.

13. The multipurpose workstation case of claim 1, further comprising:
   one or more backpack strap rings on the back plane of the body; and
   one or more backpack straps.

14. The multipurpose workstation case of claim 1, further comprising:
   one or more drawers; and
   one or more drawer tracks by which the one or more drawers can slide into and out of the body.

15. A portable multipurpose workstation case comprising:
   a lid comprising a top plane perpendicular to two lateral planes, a front plane, and a back plane;
   a body comprising a front plane, a back plane, and a top plane that is parallel to a bottom plane, wherein the top plane and the bottom plane are perpendicular to and attached to two lateral planes;
   means for interconnecting the back plane of the body to the back plane of the lid and for enabling the front plane of the lid to pivot away from the front plane of the body; and
   one or more drawers that are operable to lie inside the body and parallel to the bottom plane of the body, the one or more drawers being further operable to be drawn through the lateral planes of the body to a position outside of the body; and
   wherein the lid further comprises one or more sloped sheaths located on each of the lateral planes of the lid, wherein the one or more sloped sheaths are so dimensioned as to prevent the one or more drawers from being drawn through the lateral planes of the body when the lid is in a closed position.

16. The portable multipurpose workstation case of claim 15, wherein the inner surfaces of the front and back planes of the body comprise one or more drawer tracks.

17. The portable multipurpose workstation case of claim 16, wherein each of the one or more drawers comprises one or more flanges operable to slide into the one or more drawer tracks.

18. A portable multipurpose workstation case comprising:
- a lid comprising a top plane perpendicular to two lateral planes, a front plane, and a back plane;
- a body comprising a front plane, a back plane, and a top plane that is parallel to a bottom plane, wherein the top plane and the bottom plane are perpendicular to and attached to two lateral planes;
- means for interconnecting the back plane of the body to the back plane of the lid and for enabling the front plane of the lid to pivot away from the front plane of the body; and
- one or more work surfaces that are operable to lie inside the body and parallel to the bottom plane of the body, the one or more work surfaces being further operable to be drawn through the lateral planes of the body to a position outside of the body, wherein each of the one or more work surfaces comprises a lower work surface panel and an upper flip panel;
- wherein the lower work surface panel and the upper flip panel each comprise one or more means for securing one or more documents to the lower work surface or the upper flip panel; and
- wherein the lower work surface panel comprises an indentation in which to overlay the means for securing one or more documents to the upper flip panel so as to enable the upper flip panel to fold flat against the lower work surface panel.

* * * * *